Jan. 19, 1932. J. J. KANE 1,841,605
POWER SYSTEM
Filed May 24, 1920
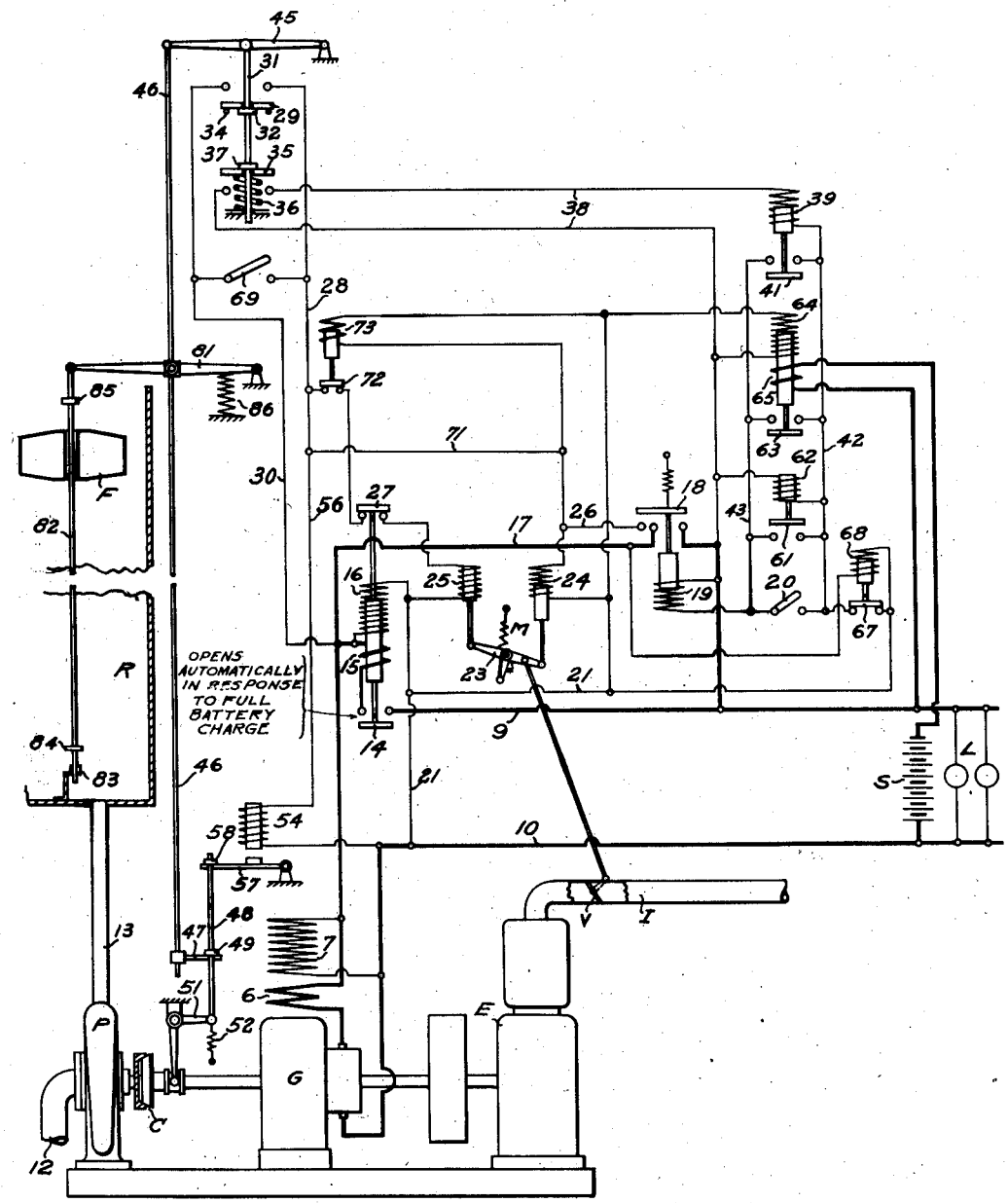

Patented Jan. 19, 1932

1,841,605

UNITED STATES PATENT OFFICE

JOHN J. KANE, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE

POWER SYSTEM

Application filed May 24, 1920. Serial No. 384,412.

This invention relates in general to an automatic power system wherein an engine is automatically controlled to maintain one or more desired conditions of operation or non-operation of apparatus driven by the engine; and it has particular relation to a system of this general character wherein the engine is automatically controlled to maintain the desired conditions of operation or non-operation as to several different machines.

In some instances of the prior art an engine is arranged to drive a generator and is automatically controlled, as to both starting and stopping, by the condition of the storage battery, as to charge or discharge, or other elements of the load on the electrical consumption circuit. Again, in other instances, where an engine is arranged to drive a pump, the engine is automatically stopped or otherwise controlled when the level or pressure of fluid pumped has reached a desired point; and, in some cases, both the starting and stopping of the engine are wholly automatic in response to low level or pressure conditions and high level or pressure conditions of the fluid pumped.

In any engine-driven system wherein the engine is automatically started by a dynamo-electric machine intended for normal use as a generator, there is considerable strain upon the electrical side of the system, both the dynamo-electric machine and the storage battery, during starting; and, hence, it is extremely desirable to reduce to a minimum the number of starting operations of the dynamo-electric machine. However, when the engine is used for driving a pump or other machine in addition to an electric generator, and an attempt is made to render the control of the engine automatic in response to both level or pressure conditions of a fluid reservoir and conditions of the storage battery or other element of the electrical load, the dynamo-electric machine of the system is called upon for a considerably greater number of starting operations for the engine than if the generator were the only apparatus driven by the engine.

This invention contemplates the provision of a power system including an engine arranged to drive a plurality of machines one of which is capable of operation as a motor for engine-starting purposes, in the embodiment of the invention illustrated herein these machines being considered as a pump, operative to accumulate a desired head or pressure on fluid in a storage reservoir, and a generator arranged to supply an electrical load including a storage battery, along with automatic means responsive to predetermined pressure or level conditions of the storage reservoir and predetermined conditions of the electrical load on the generator for controlling the operation of the engine. As will be pointed out herein, these controlling means may be such that the engine may be started in response to the attainment of a predetermined minimum condition relating to either the pump, including its storage reservoir, or the generator, including its load, and may be stopped only in response to the attainment of predetermined maximum conditions relating to both the pump and the generator, and there will be no undue loss of power upon the attainment of the maximum condition relating to one of the machines prior to the attainment of the maximum condition relating to the other machine.

It is an object of this invention to provide an improved automatic power system including an engine arranged to drive a plurality of different machines, and means for automatically controlling the operation of the engine in response to predetermined conditions relating to the several machines.

It is a further object of this invention to provide an improved automatic power system including an engine arranged to drive several different machines or pieces of apparatus, one being capable of operation as a motor for starting the engine, and the system including automatic means for controlling the operation of the engine in response to one or more desired or predetermined conditions associated with the several machines.

It is a further object of this invention to provide an improved automatic power system including an engine arranged to drive an electric generator and a second machine, and means for automatically controlling the starting of the engine in response to predetermined conditions relating to either the generator or the second machine and for controlling the stopping of the engine in response to predetermined conditions relating to both the generator and the second machine.

It is a further object of this invention to provide an improved automatic power system including an engine arranged to drive a pump connected to a fluid supply system and a generator connected to a load including a storage battery, and means for automatically controlling the operation of the engine in response to conditions relating to both the fluid supply system and the generator load.

These and other more or less specific objects and advantages are attained by this invention, various novel features of which will appear from the description and drawings, disclosing an embodiment of such invention, and will be more particularly pointed out in the claims.

In the accompanying drawings, there is a diagrammatic showing of an automatic power system including features of this invention.

In the embodiment of the invention disclosed, an engine E, preferably of the internal combustion type, is connected in driving relation with a dynamo-electric machine G, of a type readily operable as either a generator or motor, and a pump P, the engine and the generator being here shown as being mounted upon the same shaft; and a clutch C is provided for controlling the power connection between the shaft of the engine and generator and the pump.

The generator G is here shown as being of the compound wound type, having a series field 6 and a shunt field 7, the terminals of the generator being connected to the supply line 9, 10. Any suitable controller may be provided in connection with the generator field for maintaining constant voltage thereon, in case the same may be necessary. A storage battery S is connected across the supply line 9, 10 between the terminals of the generator and the various other elements of electrical load, indicated generally at L.

The pump P is here shown as being of the centrifugal type, having an inlet 12 and a discharge 13 connected to a reservoir R which may be either an open cistern or tank as shown herein, or a closed tank containing a body of air which may be put under pressure to maintain a desired pressure on the fluid within the tank.

The fuel inlet or supply pipe to the engine E is indicated at I, a throttle or control valve V being located in the inlet to control the admission of fuel to the engine.

A cutout switch 14 is provided in one side of the supply line 9, this switch being of ordinary type for this purpose and being operated in response to conditions in its series energizing winding 15 and its shunt energizing winding 16, these windings being differentially connected. It will be apparent that switch 14 is closed only when the engine is driving the generator at a sufficiently high speed and developing suitable charging voltage and while the battery has not yet reached a condition of full charge, this switch opening automatically when the battery has reached this condition of full charge and also when the generator speed or voltage drops below normal charging value, in this latter case there ceasing to be any appreciable holding effect by the series winding 15 and there occurring a reverse flow of current through such series winding with consequent more ready deenergization of the magnet and opening of the switch.

In order to provide for starting the engine through the dynamo-electric machine G, the latter, acting as a motor, a short-circuiting connection 17 is provided which is in parallel to the portion of the supply line 9 which contains the cut-out switch 14. This short-circuiting path 17 is controlled by a switch 18 biased to open position as by a spring, as shown herein, the switch being here provided with an operating electromagnet 19 whose energizing circuit may be completed through a hand-operated switch 20 whenever it is desired to close the switch 18 for engine-starting purposes, this energizing circuit being thus completed from the supply line 9 through the switch 20 and the connection 21 to the supply line 10.

The controlling valve V in the inlet to the engine E is connected through suitable mechanical connections to an actuating lever 23, pivoted at an intermediate point and operable in either direction to open or close the valve V. Electromagnets 24 and 25 have their plungers operatively connected to opposite extremities of the lever and are effective to actuate the lever in either direction, depending upon which of the electromagnets is energized. The circuit of the electromagnet 24 is completed through the switch 18 when the latter is moved to closed position to effect the engine starting operation, the circuit being completed from the supply line 10 and the connections 21 and 26 through an auxiliary contact of this switch, as indicated, to the supply line 9. Energization of the electromagnet 24 causes operation of its plunger so as to actuate lever 23 in a direction to cause opening of the valve V, this operation being, under ordinary circumstances, practically coincident with the completion of the starting circuit of the dynamo-electric machine G. The energizing winding of the electromagnet 25 is in series with a switch 27, the movable element of which is attached to the operating rod of the cut-out switch 14. The switch 27 is in closed position when the switch 14 is open, and vice versa. The energizing circuit of the magnet 25 is completed from the supply line 10, through a connection 27, and through a connection 28 and a bridging switch 29, when the latter is in closed position, and a connection 30 to the supply line 9 at a point between the generator and the cut-out switch 14.

The lever 23 is preferably provided with some means for releasably holding it in the last operative position to which it has been moved by the magnets 24, 25. This means may be, as shown in the drawing, a spring M having one end fixed and the other end attached to a projection on the lever so that the latter end of the spring moves from one side to the other of the line joining the fixed end of the spring and the axis of the lever.

The switch 29 may be in the form of a bridging plate perforated at its center to receive an operating rod 31 freely movable therein and provided with an abutment 32, adjustable as desired, below the bridging plate 29. The rod 31 is connected to a float F, as here shown, associated with the reservoir R so as to rise as the level in the reservoir rises and to fall as the level falls. A stationary stop 34 may be provided to limit the downward movement of the bridging plate 29 away from its fixed contacts. A second bridging plate 35, preferably similar in shape to the plate 29, is operatively associated with the rod 31, the rod passing through a central opening in the plate and the latter being biased to a position away from its fixed contacts by a spring 36 mounted between the bridging plate and a fixed abutment, as shown. The rod 31 is provided with an operating abutment 37 above the bridging plate 35 and cooperative therewith, when moved downwardly by the float F, to force the plate downwardly against the action of spring 36 and into engagement with the fixed contacts of switch.

When the bridging plate 35 is in closed position, it completes a circuit from the supply line 9 and through connections 38 and the energizing winding of the operating magnet 39 of the switch 41, and connections 42 and 21, to the supply line 10. The switch 41 completes a circuit, through the connections 42 and 43, which is in shunt to the switch 20, and thus is effective to complete the energizing circuit of the operating magnet 19 of the starting switch 18. It will be apparent then that when the bridging plate 35 is moved to closed position, in response to low water in the reservoir R, the starting switch 18 is closed to effect starting of the engine.

A lever 45, pivoted at one end, is attached at an intermediate point to the actuating rod 31 for the switches 29 and 35, and has a connection at its free end to a reciprocating rod 46. Adjustably mounted on a portion of this rod is an arm 47 arranged to actuate a rod 48 when the rod 46 is moved upwardly, through co-operation with an abutment member 49 adjustably held in position on the rod 48. The lower end of this rod 48 is attached to a bell crank lever 51 which actuates the movable element of the clutch C into and out of operative position. Means, such as the spring 52, are provided for biasing the clutch member to clutching position. It will be apparent that the reciprocating rod 46 forms a connection between the lever 45 attached to the switch-operating rod 31 and the operating rod 48 of the clutch C, so that when the rod 46 is shifted upwardly from normal position shown in response to the float F in the reservoir R, the switch 29 is moved to closed position and the clutch C to released position at the same time, and when the rod 46 is shifted downwardly from normal position, the switch 35 is closed. Gravity or a suitable spring is effective to return the switch 29 to normal position, and the spring 36 is effective to return the switch 35 to normal position when the effect of the rod 46 is removed. Likewise, the spring 52 serves to return the rod 48 to normal position.

As an auxiliary or alternative means for disconnecting the pump P from the shaft of the generator and engine, additional clutch-operating means are provided, the same being in the form of an electromagnet 54 arranged to operate an armature-actuated lever 57, the latter being associated with the operating rod 48 through engagement with an abutment element 58 adjustably fixed on the rod 48. This latter arrangement is such that, on energization of the electromagnet 54, the lever 57 is actuated and, through its co-operation with the abutment 58, serves to actuate the rod 48 and thus release the clutch C. The circuit of the electromagnet 54 is closed from the supply line 10, through the connections 56 and 28, the switch 29, when the latter is in closed position, and the connection 30, to the supply line 9.

As an auxiliary means for accomplishing the automatic starting of the engine when the storage battery has reached a predetermined low condition of charge, there is provided a switch 61 actuated by the electromagnet 62. The energizing circuit of this electromagnet may be closed by an ampere-hour meter, or other means, when the battery has become discharged to a predetermined extent, or, as illustrated, the circuit of the magnet 62 may be closed from the supply line 9, through the circuits 42 and 21, to the supply line 10. In the form shown, this electromagnet 62 is so designed that the switch 61 is normally held open and, on decrease of the battery voltage to a value corresponding to a predetermined low condition of charge, the switch is permitted to close and thus complete a shunt circuit about the switch 20, which causes energization of the circuit of the operating magnet 19 of the starting switch 18, with consequent automatic starting of the engine.

If desired, an additional means for automatically starting the engine may be provided, this means being of a character which will prevent discharging the storage battery at an unusually heavy rate. As disclosed, the switch 63 is effective to close a shunt circuit about the switches 20, 61 and 41 and thus close the circuit of the operating magnet 19 of the starting switch 18. The operating magnet for the switch 63 is provided with a shunt winding 64 whose circuit is closed from the supply line 9, through the connection 21 to the supply line 10, and a winding 65 in series with the storage battery between the latter and the supply line 9, the arrangement being such that this series winding carries only current passing to or from the storage battery. The windings 64 and 65 are so arranged that they are cumulative when the battery is supplying energy to the line and are in opposition when the generator is charging the battery. Further, these windings are so proportioned that the magnet is effective to operate the switch 63 to closed position only when the discharge is at a sufficiently high predetermined rate to warrant the starting of the engine, so as to enable the generator to carry the entire load or a portion thereof and thus avoid excessive discharge of the battery.

As there is no particular object in completing the circuit of the operating magnet 19 when the engine is in operation, a switch 67 is provided in the circuit of this operating magnet. This switch is biased to closed position, as indicated, and is movable therefrom by an operating magnet 68 whose winding is effective to cause opening of the switch when the winding is subjected to a voltage corresponding to operation of the engine under its own power. As illustrated, the circuit of this operating magnet is completed from the supply line 10, through connection 21 and the short-circuiting connection 17, to the supply line 9 between the generator terminals and the cut-out 14.

A manually operated switch 69 may be inserted in shunt to the switch 29 so as to cause operation of the clutch-releasing magnet 54 independently of the position of the float F, in case such operation is desired, thus rendering the pump P ineffective for the purpose of storing water, even though the engine may be in operation.

The normal energizing circuit for the clutch-releasing magnet 54, completed through the connection 30, switch 29 and connections 28 and 56, is ineffective for energizing purposes when the engine is stopped, even if the switch 29 is closed, since this energizing circuit is connected to the supply line 9 at a point between the generator terminal and the cut-out 14. An auxiliary energizing circuit is provided which is effective to release the clutch and thus remove the pump as an element of the load on the dynamo-electric machine during the engine-starting operation. This auxiliary clutch-releasing circuit is completed during the starting operation, through the starting switch 18, and the circuits 26, 71 and 56, to the supply line 10. It will be apparent that the circuit of this clutch-releasing magnet is interrupted as soon as the starting switch 18 is withdrawn from closed position, thus permitting the clutch to operate immediately to connect the pump to the shaft, in case it is necessary to accumulate fluid in the reservoir R.

As a precaution in preventing energization of the circuit of the magnet 25 during the starting operation in case the switch 29 may be in its closed position, thus opposing the operating effect of the magnet 24 in opening the engine throttle, a switch 72 may be provided in the circuit of the operating magnet 25 and in series with the switch 27. This switch 72 is normally closed, but is operable to open position by the electromagnet 73 whose energizing circuit is closed through the connection 26 when the starting switch 18 is closed. Through this arrangement, the circuit of the throttle-operating magnet 25 is open while the starting switch 18 is in closed position.

The mechanical means for actuating the switch-operating rod 31 and the clutch-operating rod 48 in response to the position of the float F include a lever 81 pivoted at one end at a fixed point and attached at an intermediate point to the operating rod 46. The free end of this lever 81 has attached thereto a rod 82, the lower end of which is movable in a guide 83 associated with the reservoir R. The rod 82 is provided with adjustably positioned abutment members 84 and 85 and passes through, or is otherwise associated with, the float F, so that this rod is moved upward by engagement of the float with the abutment 85 and is moved downward by engagement of the float with the abutment 84. It will be apparent that the abutment members 84 and 85 may be disposed in any suitable position on the rod 82, depending upon the desired permissible limits of fluid level in the reservoir.

A spring 86, or other suitable means, may serve to retain the lever 81, rod 82, rod 46 and rod 31 in a neutral position when not subjected to actuating forces due to engagement of the float F with either of the abutments 84 and 85.

It may be assumed that the illustrated disclosure is that of the system when the engine is at rest. In case it is desired to start the engine, the same may be accomplished by closing the switch 20, thus completing the energizing circuit of the operating magnet 19 of the starting switch 18. The closure of the starting switch 18 completes a circuit from the storage battery, through the short-circuiting connection 17, around the cut-out switch 14, and the field and armature circuits of the generator, thus causing the latter to operate as a motor. Closing of the starting switch 18 also completes the circuit of the clutch-releasing winding 54, through the connections 26, 71 and 56, thus causing disconnection of the pump from the generator and engine shaft. Likewise, closure of the starting switch completes the circuit of the energizing winding of the operating magnet 24, the latter being operative to open the throttle valve V of the engine. The engine is now free to operate under its own power, increasing in speed until the counter electro-motive force developed at the armature terminals is greater than the battery voltage, that is, the machine is operating as a generator and developing voltage sufficient to cause closure of cut-out switch 14 through the energizing action of the shunt winding 16. This speed and voltage is most readily reached during the starting operation since there is no load on the engine at this time. Closure of this cut-out 14 connects the engine directly to the supply lines 9, 10, permitting charging of the storage battery or supplying the load L directly from the generator terminals, the current through the series winding at this time assisting in maintaining the switch 14 closed. As the cut-out 14 is closed, the switch 27 associated therewith is opened. As soon as it is apparent that the engine is operating under its own power, the starting switch 18 may be permitted to move to open position by opening the switch 20. This opening of the starting switch de-energizes the electro-magnet 24, leaving the throttle valve V open, and also de-energizes the electromagnet 54, permitting operation of the clutch C to connect the pump to the engine shaft for operation thereby.

The system is now operative to cause the generator to supply energy to the storage battery and the load L, and the pump to furnish fluid under pressure to the reservoir R.

Assume that the level of liquid in the reservoir R has reached the point where the float F engages with the abutment 85 and thus actuates the lever 81 and the rod 46 connected thereto. This causes actuation of the rod 31 to close the switch 29, and also actuation of the clutch-operating rod 48, through the arm 47, to release the clutch and thus disconnect the pump from the engine. In addition to the mechanical effect exercised on the rod 48, the armature-actuated lever 57 is actuated through energization of the magnet 54 on closure of the switch 29. Either of these actuating means for the clutch-operating rod 48 may be, in itself, sufficient for effecting the desired actuation of the clutch.

The parts of the system will remain in this latter condition while the engine and generator are in operation. When, however, the storage battery has become fully charged, the current in the series winding 15 of the operating electromagnet of the cut-out switch 14 dropping to a minimum at this time, with consequent decrease in the effective energization of this operating magnet, the cut-out switch opens automatically, this automatic opening of the switch 14 being incident to the battery becoming fully charged, as hereinabove described. This operation of the cut-out causes closure of the switch 27, thus completing the operating circuit of the electromagnet 25, through the switch 29, the latter having been closed previously, as described above. Energization of the electromagnet 25 causes closure of the throttle valve V, cutting off the supply of fuel to the engine and stopping operation of the latter.

Assume that the storage battery is sufficient to carry any load imposed thereon for the time being and that the reservoir R is discharged to a point at which the float F comes into engagement with the abutment member and causes operation of the rod 82 and the operating lever 81 connected with the rod 46. This downward movement of the rod 46 causes operation of the rod 31 to move the switch 35 to closed position, against the action of the spring 36. Closure of the switch 35 completes the energizing circuit of the operating electromagnet 39, causing closure of the switch 41, the latter being effective to close the circuit of the operating magnet 19 of the starting switch 18. The starting switch 18 is thus closed and the starting operation is similar to that disclosed in connection with closure of the manually-operated switch 20. The fact that the switch 35 may remain in closed position for some time after the engine is started is of no effect in causing further operation of the starting switch 18, because the circuit of the operating magnet 19 is opened at the switch 67 as soon as the engine is started.

If the engine is at rest, and the storage battery becomes discharged beyond a predetermined point, as measured by the decreased voltage across the battery terminals, or otherwise, the switch 61 closes, its energizing winding 62 being no longer effective to hold it open. Closure of the switch 61 is effective to complete the energizing circuit of the operating magnet 19 of the starting switch 18; and the starting operation is similar to that described in connection with closure of the switch 20 or the switch 41.

Again, assume that the engine is at rest and the battery is supplying the electrical load. It is to be noted that while the engine is at rest, the operating magnet of the switch 63 has its shunt and series windings 64 and 65, respectively, energized by battery current, the effects of the two windings being cumulative at this time; but the series winding ordinarily does not carry sufficient current to cause closure of the switch 63. In case a load heavier than normal is put upon the battery, or remains thereon beyond a predetermined time, an increased energizing effect of the series winding 65 is sufficient to cause closure of the switch 63, thus completing the energizing circuit of the operating magnet 19 of the starting switch 18. The engine is started and the generator is thus made effective to carry the heavy load upon the circuit, thus relieving the battery of a strain that would soon cause full discharge thereof.

The ordinary operation of the generator G of the engine E, except where fairly close voltage regulation is secured, will continually include minor fluctuations in the voltage of the generator, whether these fluctuations be due to slight changes in the electrical load or to variations in the engine speed, such as may be occasioned by slight changes in its load, the feeding or character of fuel, or other cause. While these minor fluctuations in voltage have no effect in causing opening of the cut-out switch 14 while any appreciable current is flowing from the generator to the battery, however, when the battery is nearly or fully charged and no appreciable current passes from the generator to the battery, a slight decrease in the generator voltage, such as may be incident to the above mentioned minor fluctuations, may be relied upon to cause desired opening of the switch 14. In order to render more certain the desired opening of the switch 14 on the attainment of a predetermined charge of the battery (corresponding to full charge thereof), particularly in installations where the voltage regulation of the generator is fairly close, any of the pertinent teachings of the prior art may be resorted to for decreasing the energizing effect of the voltage coil 16, even to the extent of breaking the circuit of this coil. More particularly, resort may be had to such prior art expedients as are described in any of the U. S. patents to Slough Nos. 1,204,599, 1,204,600, 1,204,601, November 14, 1916, and Strong No. 1,225,283, May 8, 1917, for automatically reducing or destroying the energizing effect of the voltage holding coil of the cut-out switch on the attainment of the predetermined degree of battery charge.

The generator is always in operation when the engine is operating under its own power, independently of whether or not the system has been automatically started in response to a condition of low water in the reservoir R or some predetermined condition of the battery or other part of the load. This arrangement is such as to insure the minimum number of starting operations as well as to insure proper charge of the storage battery and the proper amount of liquid in the reservoir R.

It will be apparent that there is provided an automatic power system involving two engine-driven power-supplying machines and wherein the engine is automatically started in response to a predetermined condition relating to either of the machines and is automatically stopped only in response to the attainment of predetermined conditions relating to both machines.

While the invention has been more particularly described in connection with a system wherein automatic operation is secured through a float whose position is dependent upon the level of the fluid in a reservoir, it will be apparent that the system is equally operative where automatic operation is in response to limiting pressures of fluid in a reservoir. Likewise, any other machine operative under desired predetermined conditions may be substituted for the pump; and, as to certain features of the invention, another type of combined motor and power-supplying machine may be substituted for the generator.

While the specific electrical apparatus disclosed herein is in the form of a single machine operative as a motor for engine-starting purposes and as a generator for battery-charging purposes, it will be apparent that, as to certain features of the invention, it is immaterial whether one uses a single machine, as disclosed, or a generator permanently associated with the engine and a separate motor operative merely for engine-starting purposes, as in the case of the well-known two-unit starting and lighting systems.

It should be understood that it is not desired that the invention claimed be limited to the exact details of construction shown and described, for obvious modifications will occur to a person skilled in the art.

It is claimed and desired to secure by Letters Patent:

1. In combination, an engine, electrical apparatus having both motor and generator characteristics and operatively associated with said engine, an additional machine operable by said engine, and means for automatically controlling the operation of said engine in response to predetermined conditions relating to said apparatus and said additional machine, said controlling means permitting useful operation of said additional machine by said engine after cessation of supply of electrical energy by said electrical apparatus.

2. In combination, an engine, a storage battery, electrical apparatus operable as a motor from said storage battery to start said engine and as a generator driven by said engine to supply said storage battery, an additional machine operable by said engine, a releasable driving connection between said engine and said additional machine, and means for automatically controlling the operation of said engine, said means including instrumentalities operative at the will of the operator to insure stoppage of said engine upon substantial completion of a predetermined battery charge or to permit said engine to drive said additional machine upon substantial completion of charging of said battery.

3. In combination in a power system, an engine, a source of energy, apparatus operable as a motor supplied from said source for starting said engine and as a generator driven by said engine for supplying said source, an additional machine normally connected to said engine, said apparatus being operatively connectible to said engine and available to supply said source whenever said engine is operative to drive said additional machine, and controlling means for said system including means responsive to predetermined conditions relating to said additional machine for disconnecting said machine from said engine without causing discontinuance of operation of said apparatus as a generator for supplying energy to said source.

4. In combination in a power system, an engine, a source of electrical energy, electrical apparatus operable as a motor supplied from said source for starting said engine and as a generator driven by said engine for supplying energy to said source, a pump releasably connected in driven relation with respect to said engine, a fluid reservoir connected to said pump, and controlling means for said system responsive to a predetermined condition of said source of energy for exerting a controlling effect upon the connection between said apparatus and said source and responsive to predetermined conditions of the fluid in said reservoir for automatically controlling the starting of said engine and for controlling the driving connection between said engine and said pump without substantially affecting the operation of said electrical apparatus by said engine for supplying energy to said source.

5. In combination in a power system, an engine, electrical apparatus having a motor characteristic and effective to start said engine and having a generator characteristic and operable by said engine, and an electrical circuit including a storage battery, a pump, a fluid reservoir connected to said pump, and controlling means for said system including means responsive to predetermined conditions of the fluid in said reservoir for controlling the starting of said engine through said electrical apparatus, said controlling means permitting a substantial reduction of the energy supplied by said electrical apparatus when acting as a generator without substantially affecting the operation of said pump.

6. In combination, an engine, apparatus having both motor and generator characteristics and operable to start said engine and operable by said engine, means biased to a condition wherein it releasably connects said pump in driven relation to said engine for operation thereby, and means automatically operative during the starting of said engine by said apparatus for insuring the release of the driving connection between said engine and said pump.

7. In combination, an engine, electrical apparatus operable as a motor to start said engine and as a generator driven by said engine, a storage battery in the circuit of said dynamo-electric machine, a pump, a reservoir in fluid communication with said pump, and means automatically responsive under certain conditions to the charge of said battery for exerting a controlling effect upon said engine, and a device operable at the will of the operator to insure stopping of said engine after discontinuance of normal charging of said battery or to permit continued operation of said pump by said engine after discontinuance of normal charging of said battery.

8. In combination, an engine, electrical apparatus operable as a motor to start said engine and as a generator driven by said engine, a storage battery in the circuit of said electrical apparatus, a pump, means for releasably connecting said pump to said engine, said latter means being biased to position wherein said pump is connected to said engine, means for insuring the disconnection of said pump from said engine during the starting thereof, a fluid reservoir connected to said pump, means responsive to predetermined conditions of the fluid in said reservoir for controlling the driving connection between said pump and said engine independently of the speed of operation thereof, and electromagnetically actuated means independently responsive to predetermined conditions of the fluid in said reservoir and the charge of said storage battery for effecting the starting of said engine.

9. In combination, an engine, electrical apparatus operable as a motor to start said engine and as a generator driven by said engine, a storage battery in the circuit of said electrical apparatus, a pump operable by said engine, means for releasably connecting said pump to said engine for operation thereby, a fluid reservoir, means for connecting said pump in fluid communication with said reservoir, means responsive to predetermined conditions of the fluid in said reservoir for rendering said pump ineffective for the purpose of supplying fluid to said reservoir without causing stoppage of said engine, and automatically operative means for causing the stoppage of said engine, said latter means comprising an electromagnetically actuated device whose effective actuation occurs only upon the simultaneous existence of predetermined conditions of the fluid in said reservoir and the charge of said storage battery.

10. In combination, an engine, electrical apparatus operable as a motor to start said engine and as a generator driven by said engine, a storage battery in the circuit of said electrical apparatus, a pump operable by said engine and connectible to supply fluid under pressure to a reservoir, means responsive to predetermined conditions of the fluid in said reservoir for controlling the effectiveness of said pump for supplying fluid to said reservoir during operation of said engine, and means automatically operative to effect stopping of said engine, said latter means comprising an electromagnetically actuated device whose effective actuation occurs only upon the simultaneous attainment of predetermined conditions of the fluid in said reservoir and the charge of said storage battery, and electromagnetically actuated means independently responsive to predetermined conditions of the fluid in said reservoir and the charge of said storage battery for effecting the starting of said engine and for rendering said pump substantially ineffective as a load on said engine during starting thereof.

11. In combination, an engine, an electromagnetic machine operable as a motor to start said engine and as a generator driven by said engine, an electrical power circuit including a storage battery and a variable electrical load connectible to said electromagnetic machine, a pump operatively connectible to said engine, a reservoir in fluid communication with said pump, means automatically operative in response to a condition of the fluid in said reservoir for causing starting of said engine and for causing said pump to be rendered ineffective for charging said fluid reservoir without affecting the operation of said electromagnetic machine by said engine, and means responsive to the drain of an abnormally large current from said storage battery to said power circuit for causing starting of said engine and responsive to a predetermined condition relating to said electrical power circuit for causing stopping of said engine when said pump has been rendered ineffective for fluid supplying purposes.

12. In an automatic electric generating system, the combination with an internal combustion engine, an electromagnetic machine adapted to serve as a generator when driven by the engine or as a motor for starting the engine, a storage battery, a load, and circuits connecting the battery, electromagnetic machine and load, of a solenoid including a coil at all times in the main battery charging and discharging circuit, and a controller in the connection between the battery and electromagnetic machine and controlled by the movement of the armature of said solenoid.

13. An automatic electric generating system of the type in which battery current may operate an electromagnetic machine to start an internal combustion engine when a predetermined load is put on the battery and in which the engine when started may drive the electromagnetic machine to generate current for carrying the load or charging the battery, distinguished by a solenoid coil in series with the battery during battery charging or engine starting operations, said coil having a core movable to control the circuit connecting the battery and electromagnetic machine.

14. A pressure system and a battery charging system including a primary source of power common to both automatically rendered effective by reduction of pressure in the pressure system, and apparatus jointly controlled by said systems to continue said power effective until said pressure is increased to a predetermined point and for their discontinuing said power if said battery has a predetermined charge, and means including a differential relay adapted to continue said power effective if the charge of said battery has fallen below a predetermined point until the charge of said battery reaches a predetermined point.

15. A pressure charging system and a battery charging system, said systems having a primary charging power, apparatus controlled by the pressure system for starting the charging power into action, said apparatus also being adapted to discontinue said power under a predetermined condition, and apparatus including a differential relay controlled by the battery charging system for continuing the charging power in action and for thereafter stopping the application of the charging power.

16. A charging system including a pressure tank and a gas engine and associated charging means for increasing the pressure, an electrical self-starter for said engine, automatically effective when the pressure is reduced, means automatically actuated by an increase of pressure in said tank to render said means ineffective to charge said tank while said gas engine operates, an electric storage battery and a charging system therefor, said gas engine furnishing power to charge said battery after said means are rendered ineffective, said battery charging system including means for stopping said engine.

In testimony whereof, the signature of the inventor is affixed hereto.

JOHN J. KANE.